J. H. Coldwell,
Baby Jumper,
Nº 43,972.  Patented Aug. 30, 1864.

Witnesses
Thos. P. McNamara
Theo Fusch

Inventor
John H. Coldwell

UNITED STATES PATENT OFFICE.

JOHN H. COLDWELL, OF NEW YORK, N. Y.

IMPROVED BABY JUMPER AND WALKER.

Specification forming part of Letters Patent No. 43,972, dated August 30, 1864.

*To all whom it may concern:*

Be it known that I, JOHN H. COLDWELL, of the city, county, and State of New York, have invented a new and Improved Baby Jumper and Walker; and I do hereby declare that the following is a full, clear, and exact description thereof, which will enable those skilled in the art to make and use the same, reference being had to the accompanying drawings, forming part of this specification, in which—

Figure 1:
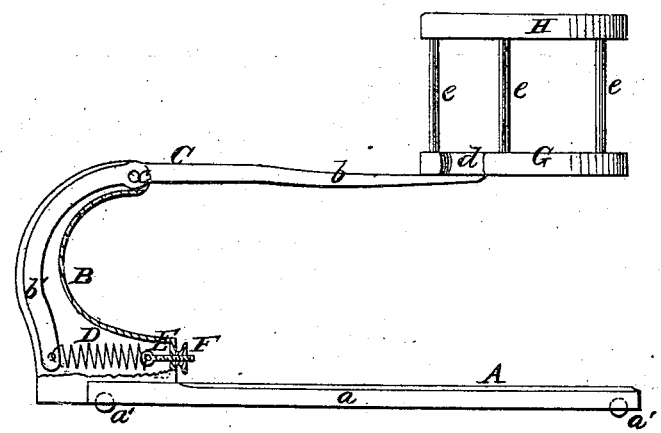
Figure 2:
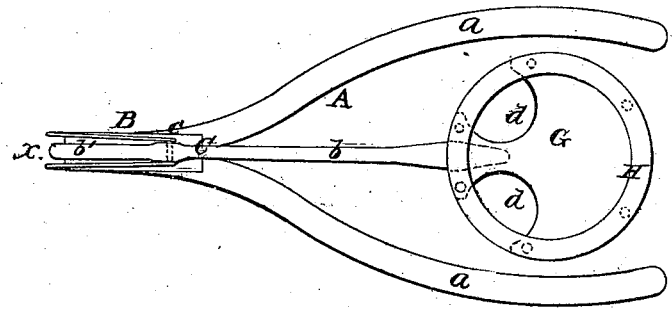

Figure 1 is a side sectional view of my invention, taken in the line $x\,x$, Fig. 2; Fig. 2, a plan or top view of the same.

Similar letters of reference indicate corresponding parts.

This invention consists in attaching a seat to a curved bar which is secured by a pivot in a socket attached to a base or support, the seat-bar having a spring connected to it and all arranged in such a manner that a very portable baby-jumper is obtained, and one which may with the greatest facility be converted into a baby-walker, when required.

A represents what may be termed the "base" of the device, the same being composed of two curved bars, $a\,a$, connected at one end and spreading out from each other toward the opposite end, as shown in Fig. 2. This base A may be provided with knobs $a'$, or casters, which would be preferable.

B is socket, which may be of cast-iron. This socket is firmly bolted to the end of the base A where the two bars $a\,a$ are secured together, and said socket is of curved form, as shown clearly in Fig. 1.

C is a bar, which is also of curved form, one part, $b$, being nearly straight, and the other part, $b'$, curved corresponding to the curvature of the socket B. This bar C is secured by a pivot, $c$, in the upper part of the socket B, the curved part $b'$ being within the socket and having a spiral spring, D, attached to its lower end, said spring having a screw, E, connected to it which passes horizontally through the lower part of the socket B and has a thumb-nut, F, on its outer end, as shown clearly in Fig. 1.

To the outer end of the bar C there is attached a seat, G, which may be of circular form, with recesses $d\,d$ in it, to admit of the legs of the child passing through. This seat has standards $c$, attached to it all around its edge, with a top rail, H, attached to them. These standards and top rail form a guard and retain the child on the seat. By turning the thumb-nut F the spring D may be adjusted to suit the weight of the child on the seat, and by a slight exertion of the child, its feet acting upon the floor, an up-and-down movement will be given the seat, the bar C vibrating on the pivot $c$. Thus by this simple arrangement I obtain a baby-jumper which may be constructed at a small cost, and one which is portable or readily moved from place to place, and it may be converted into a baby-walker by simply unscrewing the nut F, so as to let down the seat until the feet of the child may rest lightly upon the floor, and the device, if on casters, may be readily moved along under the action of the feet.

I claim as new and desire to secure by Letters Patent—

The base A, provided with the socket B, in combination with the seat-bar C and spring D, all being arranged to operate substantially as and for the purpose set forth.

JOHN H. COLDWELL.

Witnesses:
 WM. F. MCNAMARA,
 M. M. LIVINGSTON.